US012515367B1

(12) United States Patent
Zheng

(10) Patent No.: US 12,515,367 B1
(45) Date of Patent: Jan. 6, 2026

(54) PUNCHING AND BINDING MACHINE

(71) Applicant: Haocai Zheng, Dongguan (CN)

(72) Inventor: Haocai Zheng, Dongguan (CN)

(73) Assignee: DONGGUAN JIAXI OFFICE MACHINE CO., LTD., Dongguan (CN)

( * ) Notice: Subject to any disclaimer, the term of this patent is extended or adjusted under 35 U.S.C. 154(b) by 0 days.

(21) Appl. No.: 19/325,501

(22) Filed: Sep. 11, 2025

(30) Foreign Application Priority Data

Aug. 14, 2025 (CN) ......................... 202511142102.1

(51) Int. Cl.
*B26F 1/16* (2006.01)
*B42B 5/08* (2006.01)

(52) U.S. Cl.
CPC . *B26F 1/16* (2013.01); *B42B 5/08* (2013.01)

(58) Field of Classification Search
CPC ...... B26F 1/16; B26F 1/00; B26F 1/02; B26F 1/04; B26F 1/12; B26F 1/14; B26F 1/18; B26F 1/22; B26F 1/24; B26F 2210/00; B26F 2210/02; B42B 5/08; B42B 5/00; Y10T 83/944; Y10T 83/943
USPC ............ 30/358–363, 366–368; 412/33, 38, 9
See application file for complete search history.

(56) References Cited

U.S. PATENT DOCUMENTS 3,967,336 A * 7/1976 Cutter ..................... B42B 5/103 83/590
5,527,142 A * 6/1996 Chih-Kwo ................ B42B 5/08 412/38
5,827,034 A * 10/1998 von Rohrscheidt ...... B42B 4/00 412/38
6,079,924 A * 6/2000 Chiang .................. B42B 5/123 83/633
2006/0140744 A1* 6/2006 Chiang .................. B42B 5/103 412/33
2008/0107500 A1* 5/2008 Cheng ...................... B26F 1/02 412/38
2022/0234239 A1* 7/2022 Maletich .................. B26F 1/14

* cited by examiner

*Primary Examiner* — Phong H Nguyen

(57) ABSTRACT

A punching and binding machine comprises a base; a bracket fixed to the base; a drive mechanism connected to the bracket; a punching mechanism, including a limit plate, a punching cutter, and an adjusting pin, the limit plate being slidably connected to the drive mechanism, the adjusting pin being connected to the top of the punching cutter, the limit plate being provided with a limiting groove that allows the adjusting pin to be slidably inserted, the drive mechanism driving the limit plate to move, the adjusting pin moving between a abutting state and a sliding state, and in the abutting state, the adjusting pin contacts the limiting point of the limit groove, with the limit plate driving the punching cutter to move synchronously; a binding mechanism, slidably connected to the bracket, driven by the drive mechanism to move between a compression position and a release position.

20 Claims, 13 Drawing Sheets

PUNCHING AND BINDING MACHINE

CROSS-REFERENCE TO RELATED APPLICATIONS

The application claims priority of Chinese patent application CN202511142102.1, filed on Aug. 14, 2025, which is incorporated herein by reference in its entireties.

TECHNICAL FIELD

The present invention relates to the technical field of printing consumables, and more particularly, to a punching and binding machine.

BACKGROUND OF THE INVENTION

A punching and binding machine is a modern office device that integrates both punching and binding functions, designed specifically for office environments where frequent document sorting and binding are required. The punching and binding machine typically includes a punching mechanism and a binding mechanism. In the current market, punching mechanisms usually have a fixed number of holes and binding rings with a fixed diameter, which makes it difficult to meet the diverse and personalized usage demands.

Regarding the punching mechanism, existing devices are primarily designed for A4-sized paper, and the number of holes is fixed, making it impossible to adjust the number of punches flexibly based on actual needs, thus limiting their applicability. Furthermore, during the punching process, the punching dies typically fall in a uniform sequence, lacking optimized control over the punching order. This results in significant resistance when penetrating multiple sheets of paper, often requiring the user to apply additional force to complete the operation, thereby affecting ease of use and operational comfort. Regarding the binding ring mechanism, various sizes of binding rings are sold in the market, with differing diameters. The required stroke and positioning for the binding ring during compression vary for different sizes. Additionally, due to differences in manufacturing processes, material selection, and other factors among different manufacturers, even binding rings with the same nominal diameter may have slight dimensional discrepancies. Existing binding ring mechanisms generally lack precise adjustment capabilities for the compression stroke, making it difficult to accommodate binding rings of different sizes, which can result in insufficient or excessive compression, affecting binding quality and the appearance of the documents To address this, the present invention provides a punching and binding machine that effectively solves the above-mentioned problems. It features a simple structure, easy operation, controllable number of punches, adjustable compression ring positioning, and can effectively optimize the punching sequence.

SUMMARY OF THE INVENTION

In order to overcome the shortcomings of the prior art, the present invention provides a punching and binding machine that features a simple structure, easy operation, controllable number of punches, adjustable compression ring spacing, and the ability to effectively optimize the punching sequence.

The technical solution adopted by the present invention to solve its technical problem is as follows:

A punching and binding machine, comprising:

Base;

A bracket, the bracket being fixed to the base;

A drive mechanism, the drive mechanism being connected to the bracket;

A punching mechanism, comprising a limit plate, a punching die, and an adjustment pin, wherein the limit plate is slidably connected to the drive mechanism, and the adjustment pin is connected to the top end of the punching die. The limit plate is provided with a limiting slot that allows the adjustment pin to slide and be inserted. The drive mechanism drives the limit plate to move, and the adjustment pin moves between a abutting state and a sliding state. In the abutting state, the adjustment pin abuts against the limiting point of the limiting slot, and the limit plate drives the punching cutter to move synchronously. In the sliding state, the limiting slot allows the adjustment pin to move within it;

A binding mechanism, the binding mechanism being slidably connected to the bracket, and the drive mechanism driving the binding mechanism to move between a compression position and a release position.

The beneficial effects of the present invention are as follows: Through the arrangement of the above structure, both the punching mechanism and the binding mechanism are mounted on the same base via the bracket, with the drive mechanism simultaneously driving the punching mechanism and the binding mechanism to perform punching and compression operations, respectively. The adjustment pin is connected to the top of the punching die, allowing the punching cutter to move synchronously with the adjustment pin. The drive mechanism drives the limit plate to move between the punching position and the release position. In the abutting state, through the engagement of the adjustment pin with the limiting point on the limiting slot, the punching die's operation is controlled. When the adjustment pin abuts against the limiting point on the limiting slot, the power from the drive mechanism is transmitted through the limit plate to the punching die, thereby driving it to perform the punching operation, at which point the limit plate moves to the punching position. In the sliding state, the adjustment pin freely inserts and moves within the limiting slot (i.e., it moves without control), and the punching cutter does not receive any driving force from the drive mechanism, preventing the punching action. At this time, the limit plate moves to the release position. The start and stop of the punching function of the punching cutter are achieved by the engagement of the adjustment pin with the limiting point on the limiting slot or by the free movement of the adjustment pin. Meanwhile, the drive mechanism also drives the binding mechanism to move between the compression position and the release position.

BRIEF DESCRIPTION OF DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
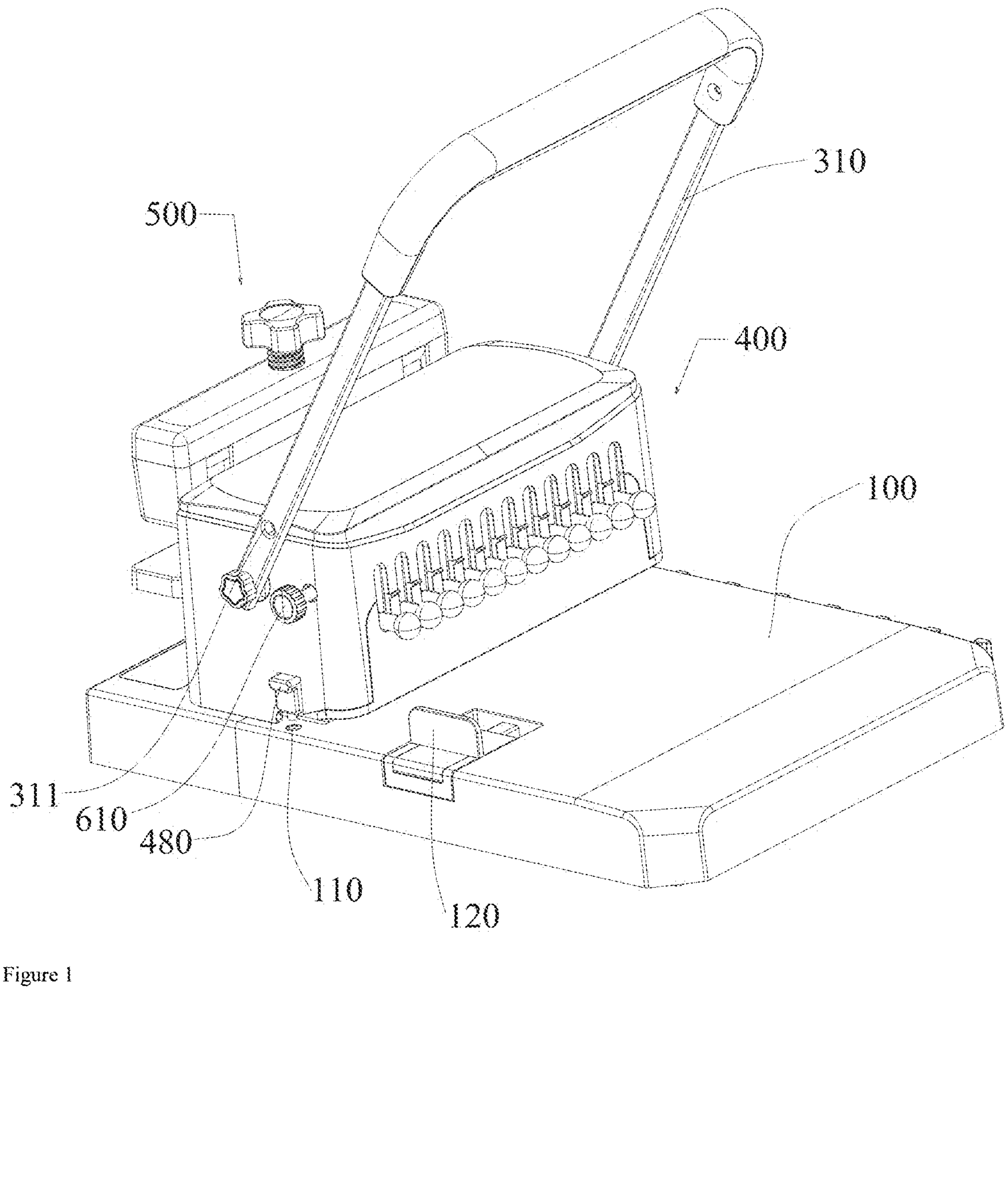
FIG. 1 is a is a schematic view of the overall structure from one angle of the present invention.
Figure 2:
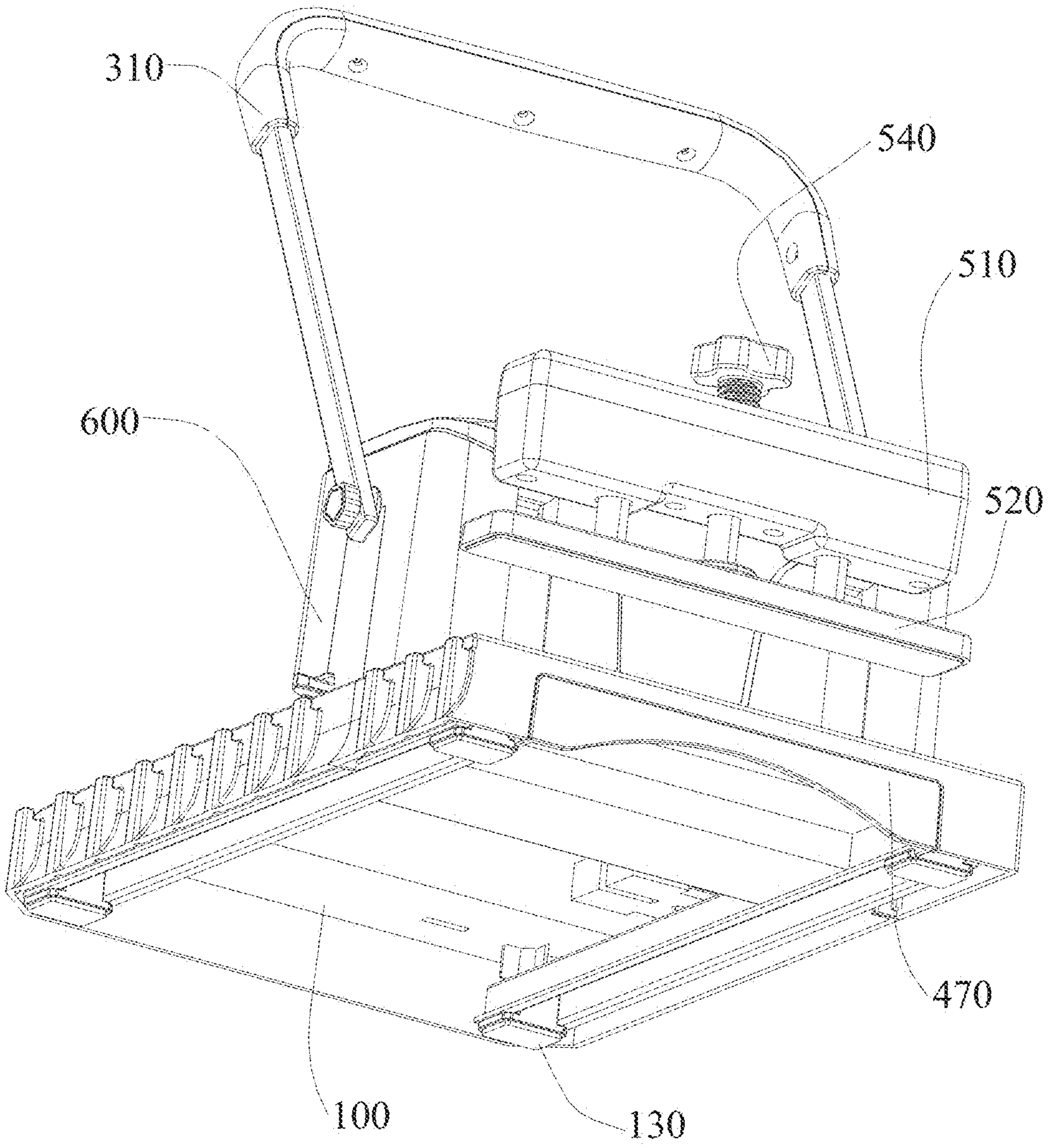
FIG. 2 is a schematic view of the overall structure from another angle of the present invention.
Figure 3:
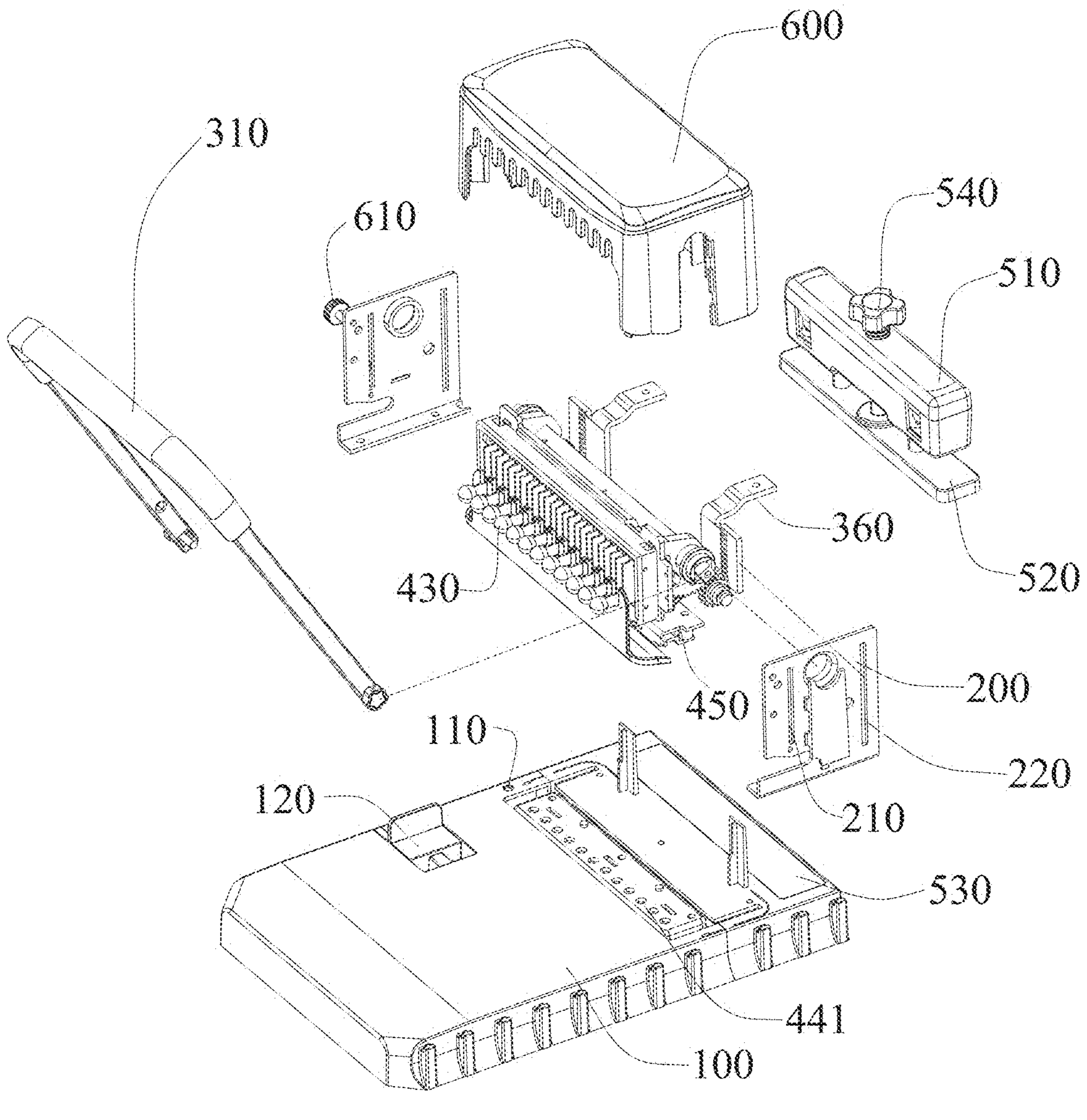
FIG. 3 is an exploded view of the structure from one angle of the present invention.
Figure 4:
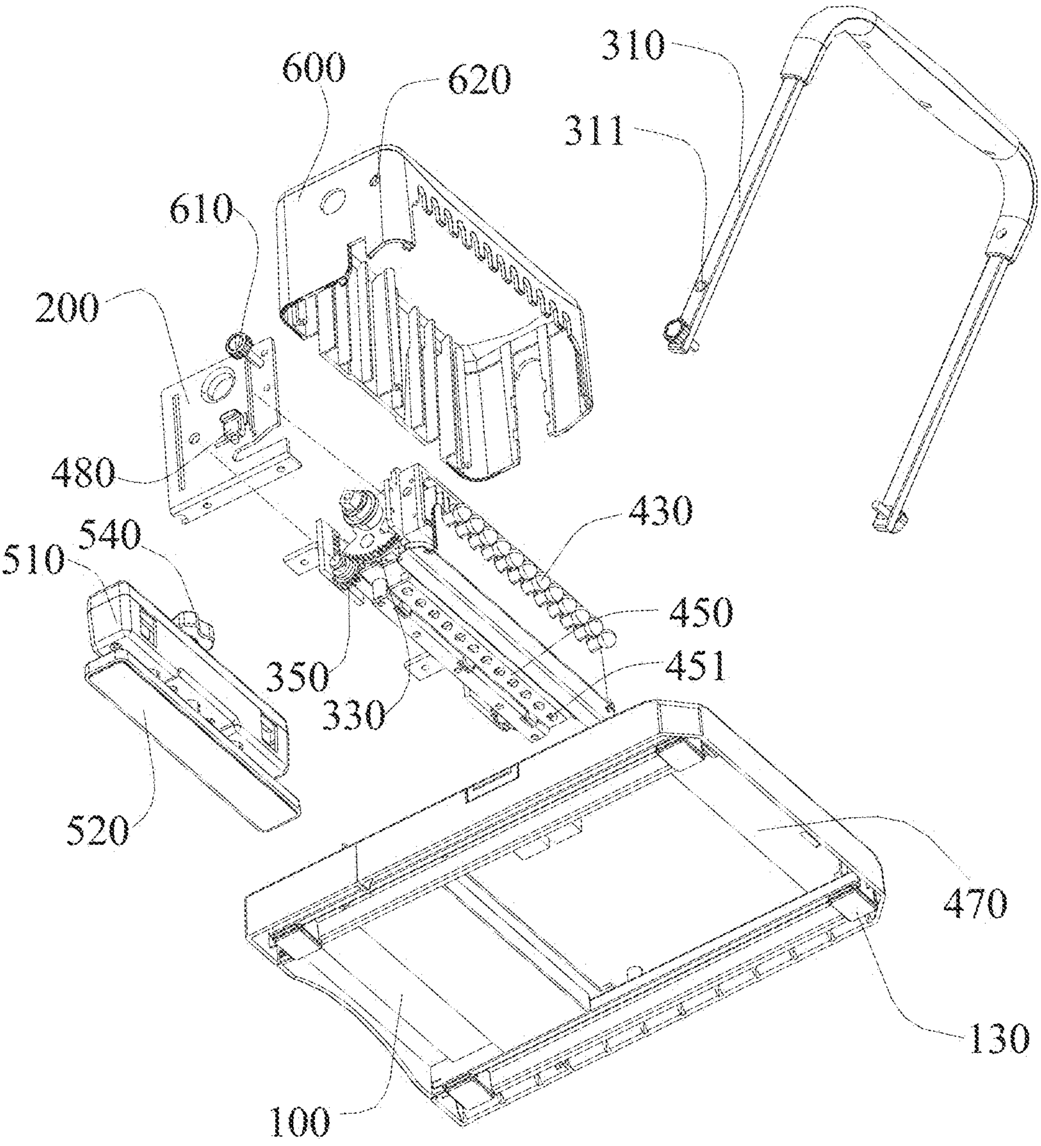
FIG. 4 is an exploded view of the structure from another angle of the present invention.
Figure 5:
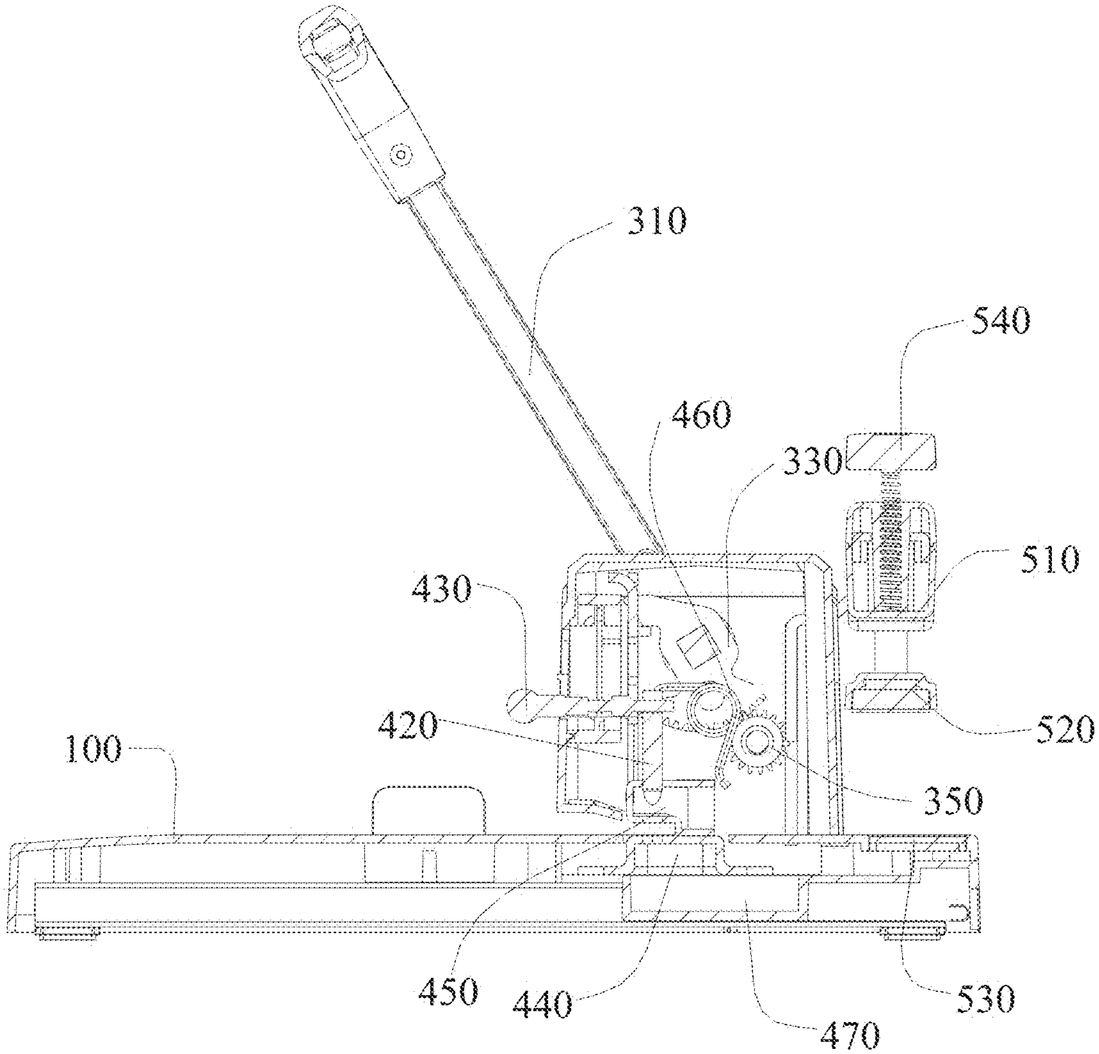
FIG. 5 is a cross-sectional view of the structure from one angle of the present invention.
Figure 6:
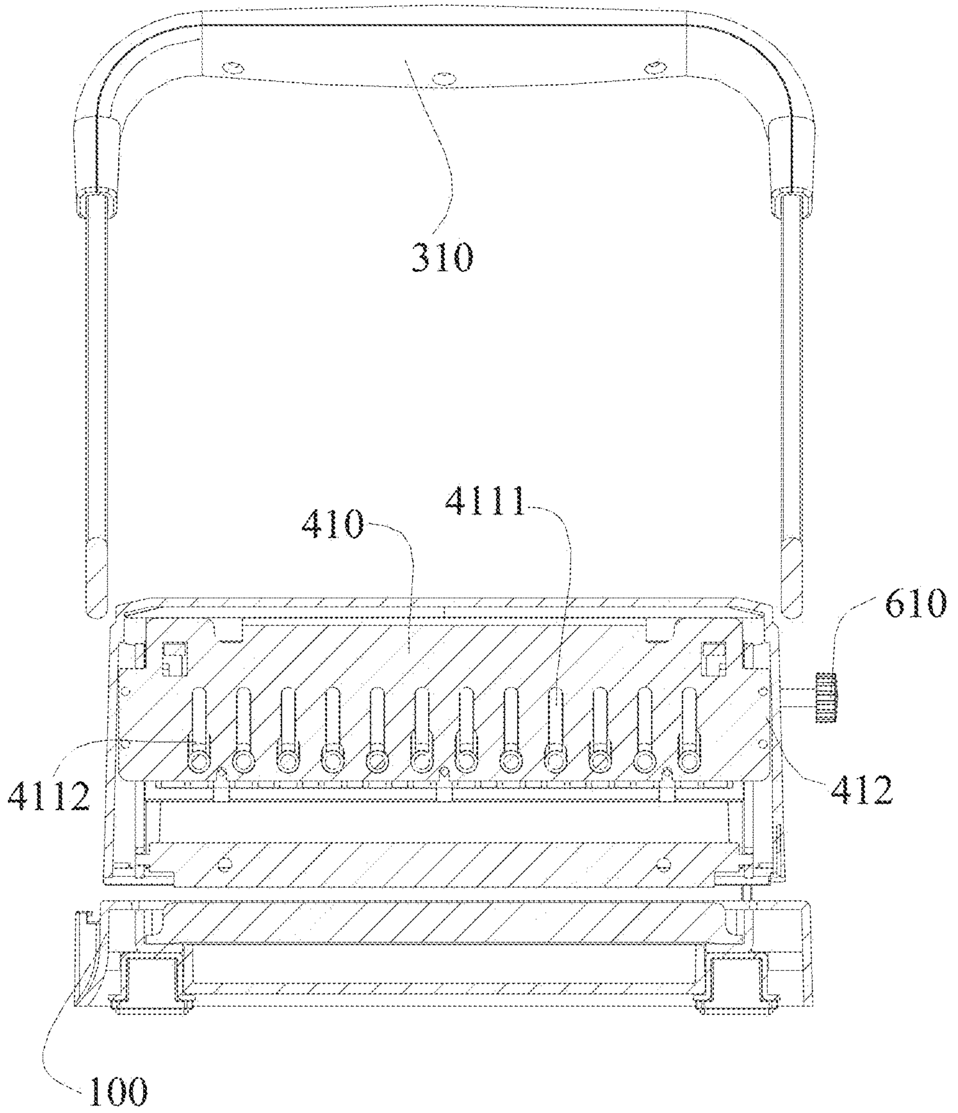
FIG. 6 is a cross-sectional view of the structure from another angle of the present invention.

To make the aforementioned objectives, features, and advantages of the present disclosure more comprehensible, specific implementations of the present disclosure are described in detail below in conjunction with the accompanying drawings. In the following description, numerous specific details are set forth to provide a thorough understanding of the present disclosure. The present disclosure may, however, be embodied in many forms different from that described here. A person skilled in the art can make similar improvements without departing from the connotation of the present disclosure. Therefore, the present disclosure is not limited by the specific embodiments disclosed below.

In the description of the present disclosure, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present disclosure can be understood based on specific circumstances.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

With reference to FIG. 1 to FIG. 17, a punching and binding machine, comprising:

Base 100;

Bracket 200, the bracket 200 being fixed to the base 100;

Drive mechanism 300, the drive mechanism 300 being connected to the bracket 200;

Punching mechanism 400, comprising limit plate 410, punching cutter 420, and adjustment pin 430, wherein the limit plate 410 is slidably connected to the drive mechanism 300, and the adjustment pin 430 is connected to the top end of the punching cutter 420. The limit plate 410 is provided with a limit groove 411 that allows the adjustment pin 430 to slide and be inserted. The drive mechanism 300 drives the limit plate 410 to move, and the adjustment pin 430 moves between a abutting state and a sliding state. In the abutting state, the adjustment pin 430 abuts against the limiting point of the limit groove 411, and the limit plate 410 drives the punching cutter 420 to move synchronously. In the sliding state, the limit groove 411 allows the adjustment pin 430 to move within it;

Binding mechanism 500, the binding mechanism 500 being slidably connected to the bracket 200, and the drive mechanism 300 driving the binding mechanism 500 to move between a compression position and a release position.

Through the arrangement of the above structure, both the punching mechanism 400 and the binding mechanism 500 are mounted on the same base 100 via the bracket 200, with the drive mechanism 300 simultaneously driving the punching mechanism 400 and the binding mechanism 500 to perform punching and compression operations, respectively. The adjustment pin 430 is connected to the top end of the punching cutter 420, allowing the punching cutter 420 to move synchronously with the adjustment pin 430. The drive mechanism 300 drives the limit plate 410 to move between the punching position and the release position. In the abutting state, the punching operation of the punching cutter 420 is controlled by the engagement of the adjustment pin 430 with the limiting point of the limit groove 411. When the adjustment pin 430 abuts against the limiting point of the limit groove 411, the power from the drive mechanism 300 is transmitted through the limit plate 410 to the punching cutter 420, thereby driving it to perform the punching operation. At this point, the limit plate 410 moves to the punching position. In the sliding state, the adjustment pin 430 freely inserts and moves within the limit groove 411 (i.e., it moves without control), and the punching cutter 420 does not receive the driving force from the drive mechanism 300, preventing the punching action. At this point, the limit plate 410 moves to the release position. The start and stop of the punching function of the punching cutter 420 are achieved through the engagement of the adjustment pin 430 with the limiting point of the limit groove 411 or the free movement of the adjustment pin 430. Meanwhile, the drive mechanism 300 also drives the binding mechanism 500 to move between the compression position and the release position. Preferably, there are twelve punching cutters 420 and twelve adjustment pins 430, with a one-to-one correspondence between each punching cutter 420 and its corresponding adjustment pin 430. Each adjustment pin 430 independently controls its corresponding punching cutter 420, thereby achieving multi-point synchronous punching.

Figure 11:
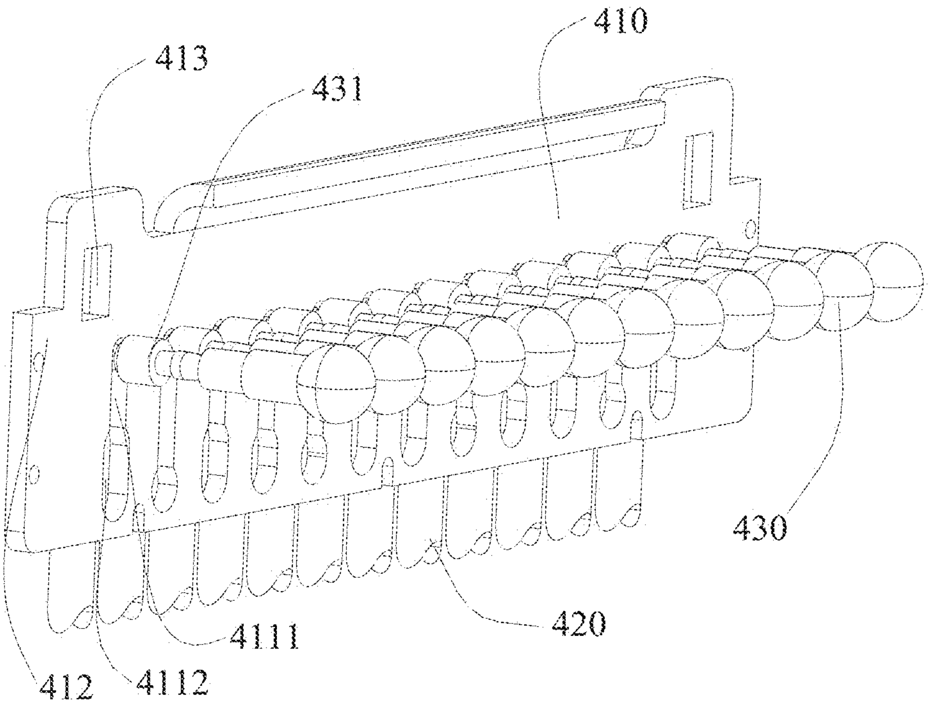
FIG. 11 is a schematic view of the first structure of a partial punching mechanism of the present invention.
Figure 12:
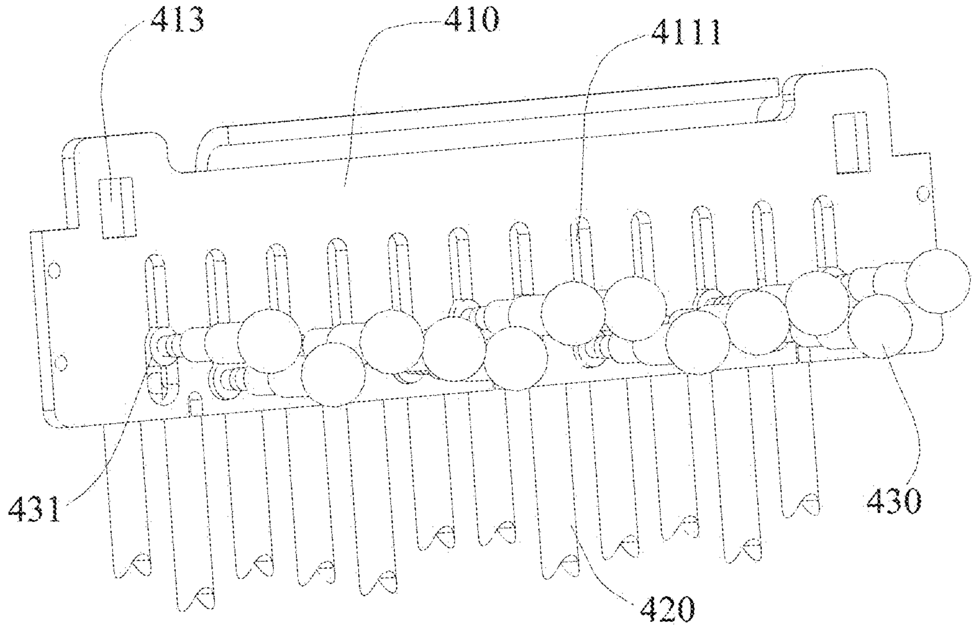
FIG. 12 is a schematic view of the second structure of a partial punching mechanism of the present invention.
Figure 13:
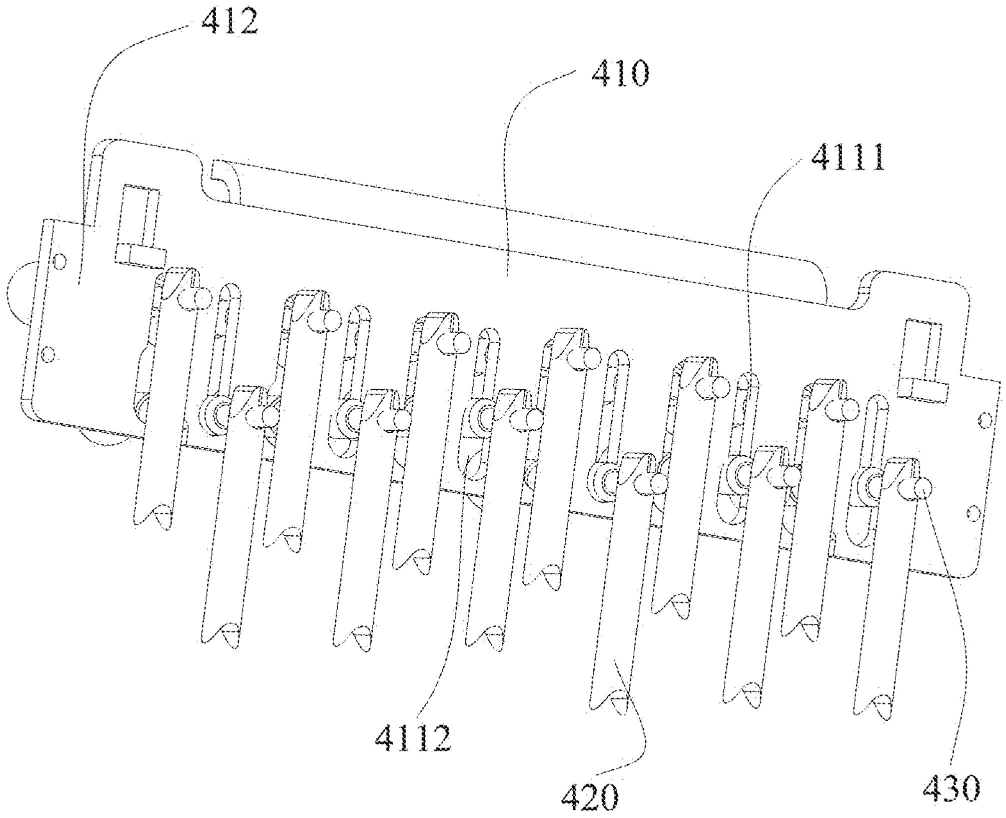
FIG. 13 is a schematic view of the third structure of a partial punching mechanism of the present invention.

In this embodiment, the punching mechanism 400 further includes a limit block 431 protruding from the surface of the adjustment pin 430. In the abutting state, the limit block 431 abuts against the limiting point, and the limit plate 410 drives the punching cutter 420 to move downward synchronously. In the sliding state, the limit groove 411 allows the adjustment pin 430 to move within it. Through the arrangement of the above structure, at least part of the adjustment pin 430 (the part without the limit block 431) is always inserted into the limit groove 411 and can move freely within the limit groove 411, thus achieving the interlocking connection between the limit plate 410 and the punching cutter 420. As shown in FIG. 11 to FIG. 13, the limit block 431 protrudes from the outer peripheral surface of the adjustment pin 430, and when it abuts against the limiting point on the limit groove 411, it is able to transmit the power from the limit plate 410 to the adjustment pin 430. Through the connection between the adjustment pin 430 and the punching cutter 420, the punching operation of the punching cutter 420 is triggered. FIG. 12 and FIG. 13 show the condition when the adjustment pin 430 is pulled outward (i.e., the limit block 431 does not abut against the limiting point on the limit groove 411), causing all or part of the punching cutter 420 to move downward to participate in the punching operation. As shown in FIG. 11, when the limit block 431 does not abut against the limiting point on the limit groove 411, the adjustment pin 430 can freely move up and down within the limit groove 411 (with the limit plate 410 as the reference). (When considering the limit plate 410 as the reference, the limit plate 410 moves up and down, and if using the adjustment pin 430 as the reference, the limit plate 410 is moving up and down.) The adjustment pin 430 and the punching cutter 420 connected to it cannot receive the driving force from the drive mechanism 300 and therefore cannot trigger the punching function of the punching cutter 420. Through the mechanical cooperation between the limit block 431 and the limit groove 411, the reliable triggering of the punching action of the punching cutter 420 is achieved, thus meeting the user's personalized needs for the number of punches.

Figure 10:
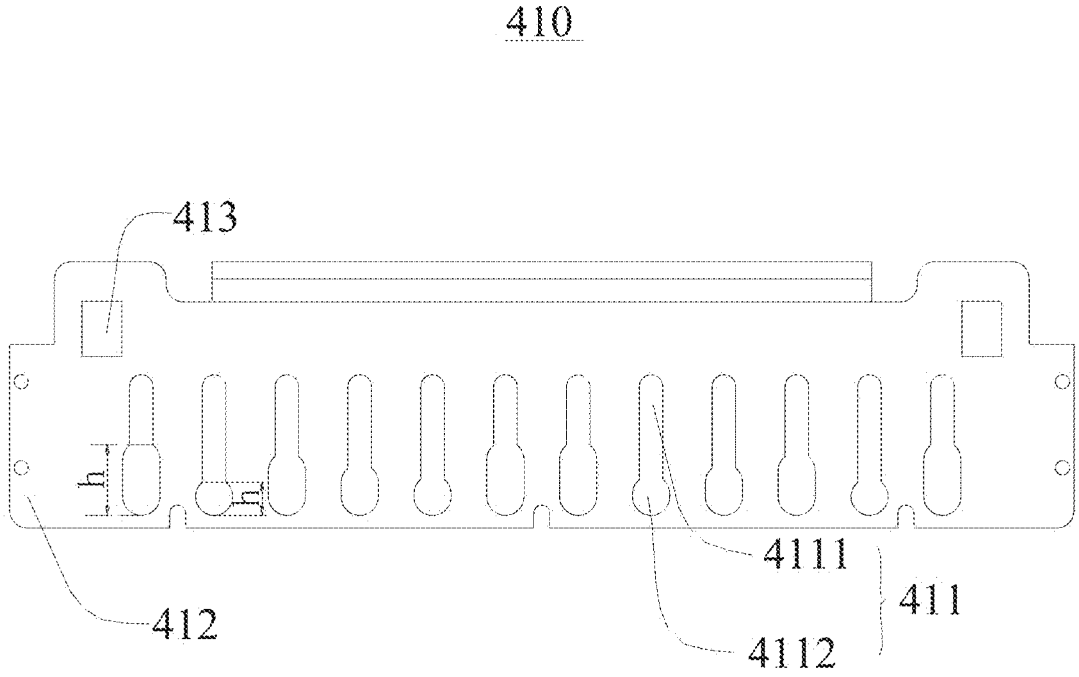
FIG. 10 is a schematic view of the structure of the limit plate 410 of the present invention.

In this embodiment, the limiting groove 411 includes a first groove 4111 and a second groove 4112 that communicates with the first groove 4111. The limiting point is located at the junction of the first groove 4111 and the second groove 4112. With the configuration of this structure, as shown in FIG. 10, the junction between the first groove 4111 and the second groove 4112, which is close to the inner side wall of the upper end of the second groove 4112, is defined as the limiting point. The first groove 4111 provides a guiding and sliding path for the adjusting pin 430, ensuring smooth motion and precise positioning. The upper inner wall of the second groove 4112 can be in contact with the limiting block 431, forming the triggering mechanism for the punching cutter 420 to perform the punching action. When the limiting block 431 is in contact with the limiting point, the punching driving force is transmitted from the limiting plate 410 to the adjusting pin 430 through the limiting block 431, thereby driving the punching cutter 420 to press downward and complete the punching. At the release position, part of the adjusting pin 430 (the part without the limiting block 431) can move freely up and down between the first groove 4111 and the second groove 4112, and the limiting block 431 will detach from the effective contact position of the limiting point. The transmission of the punching driving force is interrupted, and the punching action of the punching cutter 420 cannot be performed. This structure, by designing the limiting groove 411 as a first groove 4111 with a guiding function and a second groove 4112 with a triggering punching function, enables the controllable triggering of the punching mechanism 400. In this case, the first groove 4111 and the second groove 4112 are used to allow the insertion and movement of the adjusting pin 430 (the part without the limiting block 431), mainly serving a guiding and accommodating role. The upper inner wall of the second groove 4112 is used for the limiting block 431 to engage with it, mainly serving the transmission of the punching driving force to trigger the punching action of the punching cutter 420. Preferably, the width of the first groove 4111 is smaller than the width of the second groove 4112. The width of the limiting block 431 is smaller than the width of the second groove 4112, and the width of the limiting block 431 is greater than the width of the first groove 4111. This design allows the limiting block 431 to contact the upper inner wall of the second groove 4112 while preventing it from moving and being inserted into the first groove 4111. The width of the adjusting pin 430 is smaller than the width of the first groove 4111, allowing part of the adjusting pin 430 to move and be inserted into both the first groove 4111 and the second groove 4112. Preferably, as shown in FIG. 11, when the adjusting pin 430 is pulled outward, it is in a sliding state. At this point, the limiting block 431 has no corresponding relationship with the limiting groove 411, and under the driving force of the driving mechanism 300, the limiting block 431 will not engage with the second groove 4112. Part of the adjusting pin 430 (the part without the limiting block 431) can be freely inserted into both the first groove 4111 and the second groove 4112, and the punching cutter 420 will be unable to perform the punching operation. As shown in FIG. 11 and FIG. 12, when the adjusting pin 430 is in contact, pressing the adjusting pin 430 inward will push the limiting block 431 to engage with the limiting groove 411, causing the limiting block 431 to engage with the second groove 4112.

In this embodiment, the vertical distance from the bottom of the groove to the groove opening of each of the second grooves 4112 is not exactly the same. With the structure set as described above, as shown in FIG. 10, the vertical distance from the bottom of the groove to the groove opening of the second groove 4112 is defined as h, and the value of h is not identical. The second groove 4112 with different h values corresponds to different punching triggering sequences or punching strokes. When the limiting plate 410 moves with the driving mechanism 300, the limiting block 431 on each adjusting pin 430 sequentially contacts the upper inner wall at different heights, i.e., different h values, within the second groove 4112. The second groove 4112 with a smaller h value will cause the limiting block 431 to reach the contact position earlier, thereby activating the corresponding punching cutter 420 sooner. Therefore, by designing second grooves 4112 with different h values, time-sequenced or staggered punching of multiple punching cutters 420 can be achieved, which effectively avoids the resistance caused by the paper during the punching operation.

In this embodiment, the driving mechanism 300 includes a handle 310, a driving shaft 320, and a driving member 330. The driving shaft 320 is rotatably connected to the bracket 200, and the handle 310 is rotatably sleeved on both sides of the driving shaft 320. The driving member 330 is positioned adjacent to the handle 310 and is connected to the limiting plate 410. The handle 310 drives the driving shaft 320 and the driving member 330 to rotate synchronously, causing the limiting plate 410 to move up and down. With the structure described above, when the user presses down the handle 310, the driving force is transmitted through the driving shaft 320 to drive the driving member 330 to rotate synchronously, which in turn drives the limiting plate 410 to move along a predetermined path. When the limiting plate 410 reaches the preset position, the limiting block 431 engages with the second groove 4112, thereby driving the punching cutter 420 downward to complete the punching operation.

In this embodiment, the driving member 330 includes a coupling portion 331 and a meshing portion 332. The limiting plate 410 is provided with a clamping hole 413 that allows the coupling portion 331 to be engaged. The coupling portion 331 and the meshing portion 332 are positioned on both sides of the driving shaft 320. With the structure described above, the meshing portion 332 is positioned away from the upper end of the handle 310, while the coupling portion 331 is positioned near the upper end of the handle 310. This arrangement allows the handle 310, when pressed down, to simultaneously achieve two movements: the coupling portion 331 drives the limiting plate 410 to move downward synchronously, and the meshing portion 332 rotates.

In this embodiment, the bracket 200 is provided with a first guide rail 210, and a coupling part 412 protrudes from the end of the limiting plate 410. The coupling part 412 is slidably inserted into the first guide rail 210 and moves up and down along the first guide rail 210. With the structure described above, the first guide rail 210 and the coupling part 412 form a guiding and fitting mechanism that precisely guides the up and down movement trajectory of the limiting plate 410. This ensures that the limiting plate 410 moves stably along a predetermined straight-line path under the drive of the driving mechanism 300. The guiding structure enhances the repeatability and accuracy of the punching action and the reliability of motion, ensuring the consistency of the synchronized movement of the limiting plate 410 and each punching cutter 420.

In this embodiment, the punching mechanism 400 further includes a punching frame 440 connected to the base 100, with the upper end of the punching frame 440 being provided with a second through hole 441. The driving mechanism 300 drives the punching cutter 420 to move up and down along the second through hole 441. Through the configuration of this structure, the punching frame 440 serves as the device for placing the punched paper and is the key structure for performing the punching operation. The second through hole 441 guides and positions the punching action of the punching cutter 420. The driving mechanism 300 drives the punching cutter 420 to press downward into the second through hole 441, thereby ensuring the accuracy of the punching position and the consistency of the shape of the second through hole 441. At the same time, the fixed connection between the punching frame 440 and the base 100 ensures the rigidity and stability of the overall structure, further improving the punching accuracy and the reliability of the equipment operation.

In this embodiment, the punching mechanism 400 further includes a guide frame 450, the lower end of which is provided with a first through hole 451. The punching cutter 420 passes through the first through hole 451 and corresponds one-to-one with the second through hole 441. Through the configuration of this structure, the guide frame 450 and the first through hole 451 provide guidance for the punching operation of the punching cutter 420, effectively enhancing the straightness and stability of the punching cutter 420 during its reciprocating motion. The first through hole 451 provides linear constraint to the punching cutter 420, preventing it from bending, skewing, or jamming during frequent operations, thereby further improving the punching accuracy and the service life of the punching cutter 420. At the same time, the tip of the punching cutter 420 passes through the first through hole 451 and protrudes from the bottom surface of the guide frame 450, ensuring that the punching cutter 420 can smoothly enter the second through hole 441 and perform effective punching on the punching paper, thereby ensuring the reliable completion of the punching action.

In this embodiment, the punching mechanism 400 further includes a reset torsion spring 460, with one end of the reset torsion spring 460 connected to the guide frame 450 and the other end connected to the drive shaft 320. With this configuration, after the punching operation is completed, the user releases the handle 310, and the potential energy stored in the reset torsion spring 460 due to the elastic torsion during the punching process is released, generating a restoring torque that drives the drive shaft 320 to rotate in the reverse direction. This, in turn, drives the limit plate 410, the adjustment pin 430, and the punching cutter 420 to retreat upwards, returning to the initial standby position. Meanwhile, this resetting force also causes the guide frame 450 to separate from the punched paper, releasing the compression effect, which facilitates the removal of the punched paper and prepares for the next punching operation.

Figure 8:
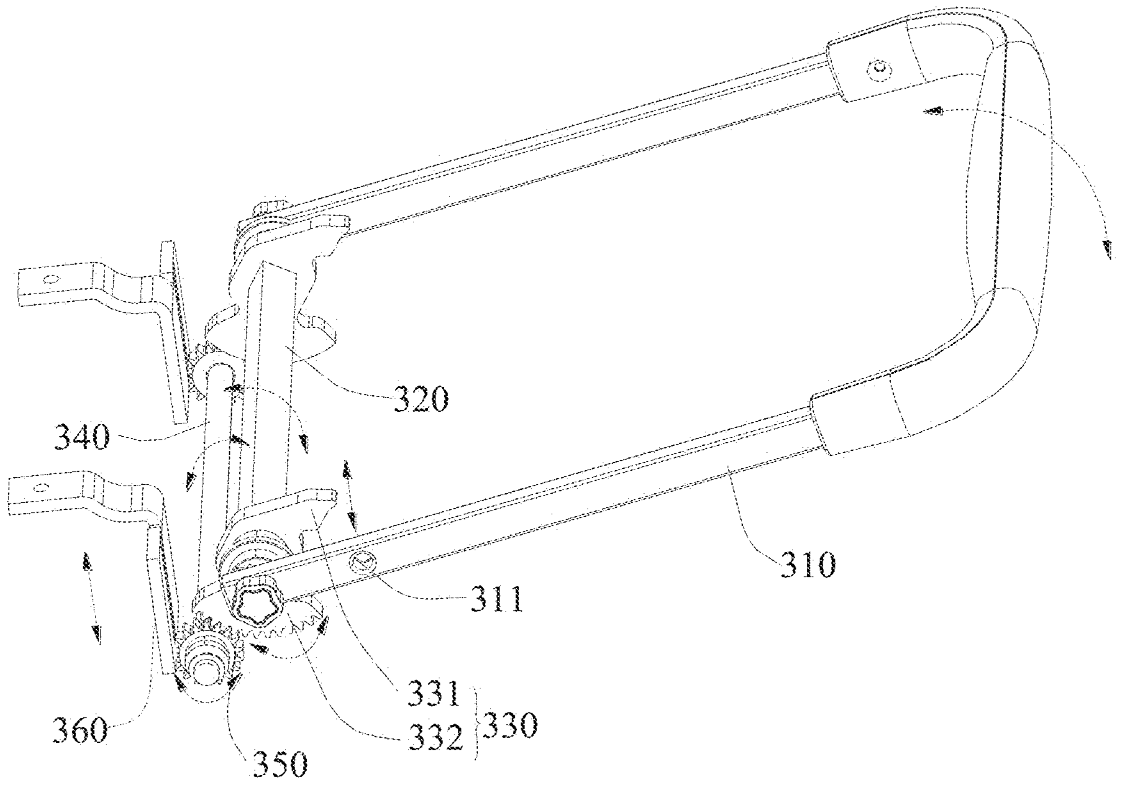
FIG. 8 is schematic view of the structure of the drive mechanism 300 of the present invention.
Figure 9:
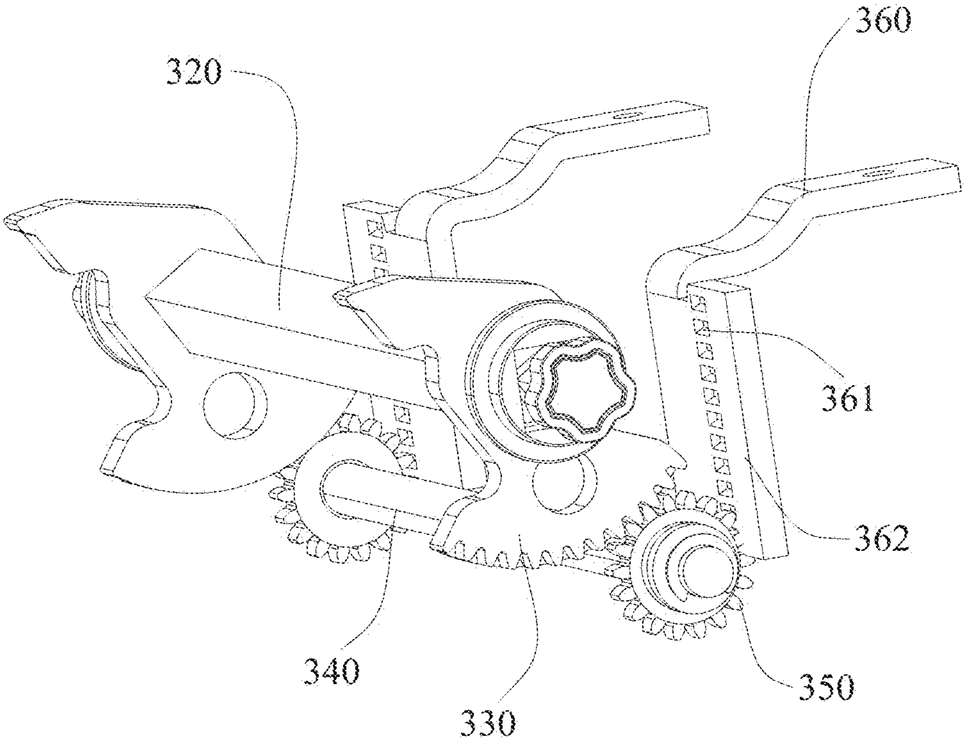
FIG. 9 is a schematic view of a partial structure of the present invention.

In this embodiment, the driving mechanism 300 further includes a drive shaft 340 and a drive gear 350. The drive shaft 340 is rotatably connected to the bracket 200, and the drive gear 350 is mounted on the drive shaft 340. The drive gear 350 is connected to the binding mechanism 500 and is engaged with the meshing portion 332. The handle 310 drives the meshing portion 332 to rotate, which in turn drives the drive gear 350 to rotate synchronously, causing the binding mechanism 500 to move up and down. With this configuration, as shown in FIG. 8, the operational state of each structure of the driving mechanism 300 is displayed. When the user presses down the handle 310, the driving force is transmitted through the drive shaft 320 to rotate the driving member 330. The meshing portion 332 drives the drive gear 350 to rotate synchronously via gear meshing, which in turn drives the drive shaft 340 to rotate, making the connected binding mechanism 500 perform the pressing operation. The driving mechanism 300 distributes the power from the handle 310 to the binding mechanism 500 through gear transmission, realizing the transmission path of "handle 310-drive shaft 320-meshing portion 332-drive gear 350-drive shaft 340-binding mechanism 500.

In this embodiment, the driving mechanism 300 also includes a transmission plate 360. The transmission plate 360 is provided with a gear groove 361 that engages with the drive gear 350. The transmission plate 360 is slidably connected to the bracket 200 and fixedly connected to the binding mechanism 500. When the drive gear 350 rotates, it drives the transmission plate 360 to move up and down, thereby driving the binding mechanism 500 to move up and down. With this configuration, the drive gear 350 is connected to the binding mechanism 500 via the transmission plate 360. When the drive gear 350 rotates under the drive of the meshing portion 332, its teeth mesh with the gear groove 361 on the transmission plate 360, converting rotational motion into linear motion of the transmission plate 360. This causes the transmission plate 360 to move downward along the bracket 200, thereby driving the binding mechanism 500 to apply downward pressure synchronously and complete the pressing operation. The transmission plate 360 and the drive gear 350 form a "gear-rack transmission mechanism," achieving reliable conversion from rotational motion to linear motion, efficiently transmitting the power of the driving mechanism 300 to the pressing operation of the binding mechanism 500. At the same time, the sliding connection between the transmission plate 360 and the bracket 200 provides good guidance and support, ensuring the reliability of the pressing operation.

Figure 15:
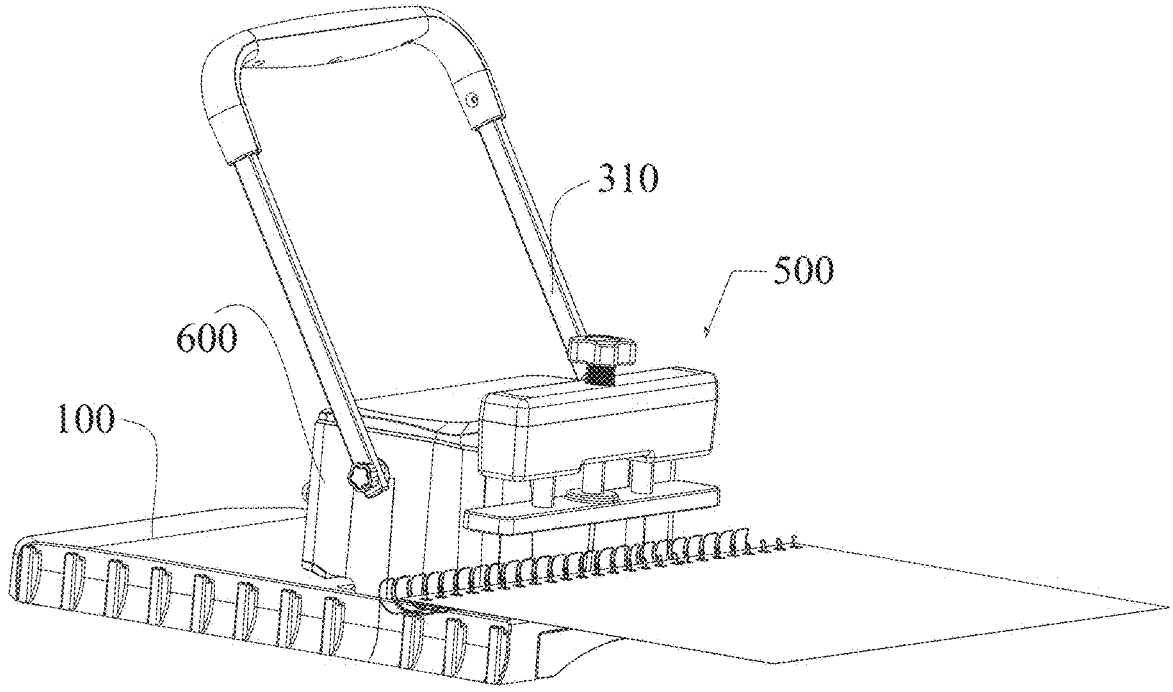
FIG. 15 is a schematic view of the structure in the second operating state of the present invention.
Figure 16:
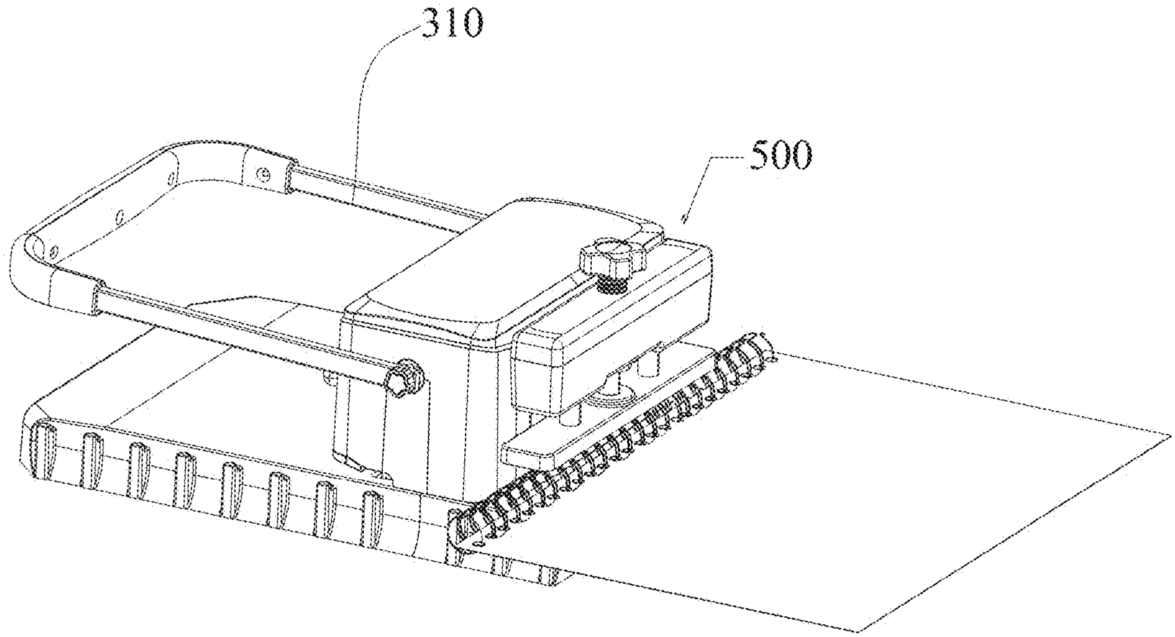
FIG. 16 is a schematic view of the structure in the third operating state of the present invention.

In this embodiment, the bracket 200 is provided with a second guide rail 220, and a transmission part 362 is protruded at the end of the transmission plate 360. The transmission part 362 is slidably inserted into the second guide rail 220 and moves up and down along the second guide rail 220. With this configuration, as shown in FIG. 15 and FIG. 16, under the drive of the handle 310, the driving mechanism 300 engages the gear groove 361 on the transmission plate 360 with the drive gear 350, driving the transmission plate 360 to move downward. This causes the transmission part 362 to reciprocate in a linear motion within the second guide rail 220. The second guide rail 220 and the transmission part 362 form a guiding and matching mechanism that guides and constrains the linear motion of the transmission plate 360, effectively preventing deflection during its up-and-down linear movement, ensuring that the transmission part 362 smoothly slides along the predetermined linear path of the second guide rail 220.

Figure 7:
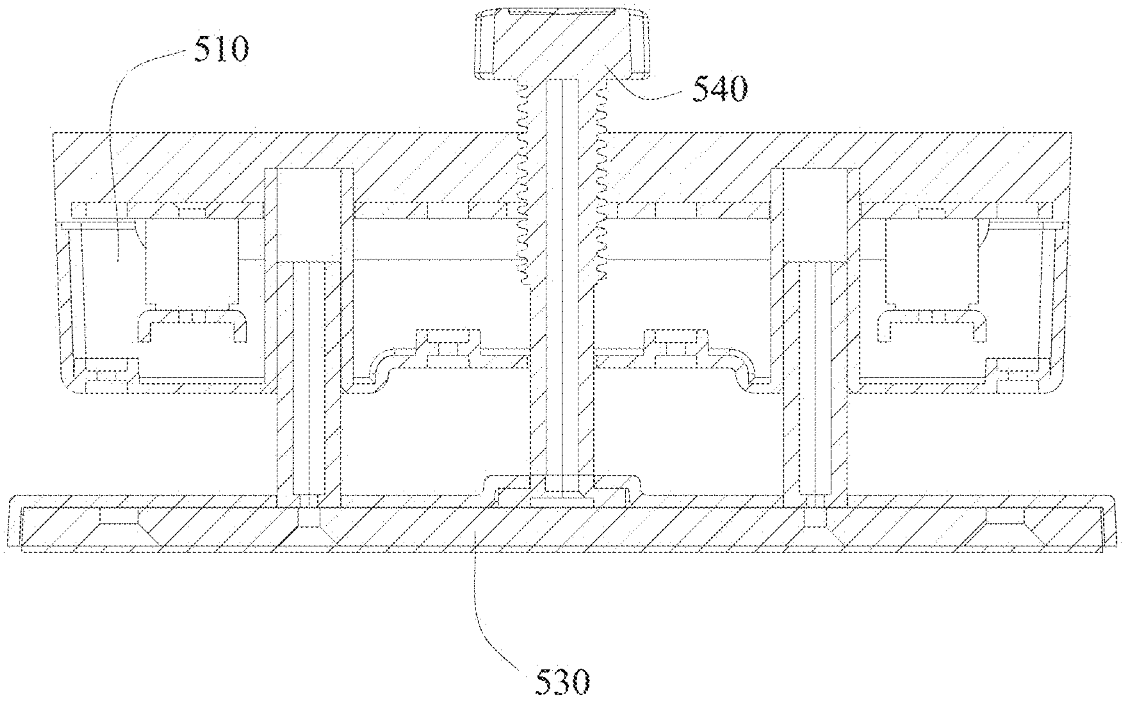
FIG. 7 is a partial cross-sectional view of the structure of the present invention.

In this embodiment, the binding mechanism 500 includes a connection plate 510 and a binding plate 520 that is slidably connected to the connection plate 510. The upper end of the transmission plate 360 is fixedly connected to the connection plate 510, and the transmission plate 360 drives the connection plate 510 to move up and down, thereby driving the binding plate 520 to move up and down. With this configuration, the connection plate 510 is slidably connected to the binding plate 520, and the transmission plate 360 is fixedly connected to the upper part of the connection plate 510. When the pressure ring is positioned, as the transmission plate 360 moves under the action of the driving mechanism 300, it drives the connection plate 510 to move downward synchronously, which in turn drives the binding plate 520 to move downward along a predetermined path, thereby performing the pressure ring operation on the punched paper with the iron ring, achieving the process of "transmission plate 360-connection plate 510-binding plate 520-pressure ring operation." When in the release position, the handle 310 is released, and the transmission plate 360, connection plate 510, and binding plate 520 move upward. Preferably, as shown in FIG. 7, the connection plate 510 and the binding plate 520 can be slidably connected through the engagement of two hollow columns, ensuring stable connection and power transmission between the connection plate 510 and the binding plate 520. Preferably, the pressing surface of the binding plate 520 is covered with velvet fabric, which serves as a cushioning and protective layer. It can contact the surface of the iron ring during the pressure ring operation, effectively preventing scratches, wear, or metallic luster damage to the surface of the iron ring.

In this embodiment, the binding mechanism 500 further includes a bottom plate 530 for placing the iron ring. The bottom plate 530 is connected to the base 100, and when the binding plate 520 moves downward towards the bottom plate 530, the binding plate 520 applies pressure to the iron ring. With this configuration, as shown in FIG. 15, the bottom plate 530 is used to place and position the iron ring to be pressed. When the binding plate 520 moves downward under the drive of the driving mechanism 300, the pressing surface of the binding plate 520 gradually approaches and presses against the iron ring placed on the bottom plate 530, causing the iron ring to plastically deform and close the open ring, completing the pressure ring operation. Preferably, the bottom plate 530 is fixed within the base 100 and is aligned with the plane of the base 100, corresponding to the vertical position of the binding plate 520, ensuring the accurate alignment of the upward and downward forces during the pressure ring operation. Additionally, the bottom plate 530 is made of magnetic material, allowing the iron ring to be fixed in place by magnetic attraction. This ensures that the open iron ring is stably placed on the bottom plate 530, preventing displacement, rotation, or misalignment before or during the pressure ring operation.

In this embodiment, the binding mechanism 500 further includes an adjustment member 540. The adjustment member 540 is connected to both the binding plate 520 and the connection plate 510, and it adjusts the distance between the connection plate 510 and the binding plate 520. With this configuration, the adjusting member 540 is used to regulate the distance between the binding plate 520 and the bottom plate 530. Preferably, the adjusting member 540 is a threaded connection structure, such as an adjusting screw or a lead screw assembly. One end of the adjusting member 540 is connected to the connection plate 510, and the other end is connected to the binding plate 520. By rotating the adjusting member 540, the binding plate 520 can be driven to move up and down, thereby precisely setting the initial gap between the binding plate 520 and the bottom plate 530. This allows for flexible adjustment of the distance between the binding plate 520 and the bottom plate 530, thus controlling the limiting position and pressing amount of the pressure ring operation, and enabling the mechanism to meet the pressing requirements of iron rings with different diameters and specifications.

In this embodiment, the punching mechanism 400 further includes a scrap box 470. The scrap box 470 is positioned below the punching frame 440, and the receiving space of the scrap box 470 is connected to the second through hole 441. With this configuration, during the punching process, the cut paper debris is driven by the output end of the punching mechanism 400, detaching from the second through hole 441 and falling into the scrap box 470. The scrap box 470 is used to collect the paper debris generated during the punching operation, effectively preventing debris from scattering inside a punching and binding machine or on the surface of the base 100, maintaining a clean punching environment and avoiding malfunctions of the punching mechanism 400 caused by debris accumulation. Additionally, the detachable design of the scrap box 470 makes it easy for users to clean and maintain regularly.

Figure 17:
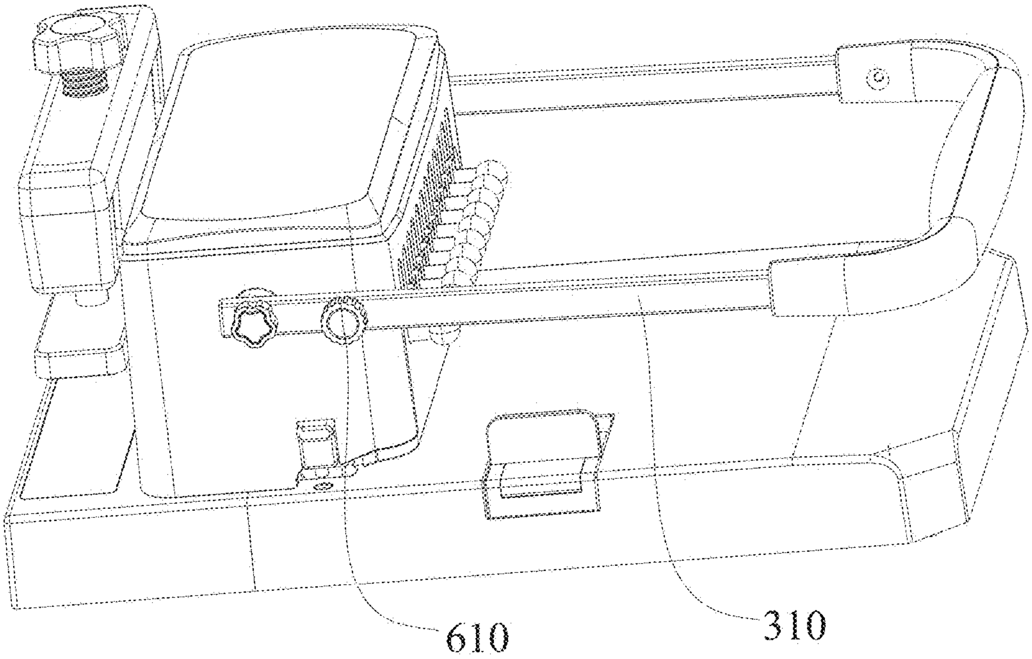
FIG. 17 is a schematic view of the structure in the storage state of the present invention.

In this embodiment, the apparatus also includes an outer casing 600. The bracket 200 is positioned inside the outer casing 600, and a scale is provided on the side of the outer casing 600 near the binding mechanism 500 to indicate the diameter of the iron ring. On the side of the outer casing 600 near the handle 310, there are a fixing pin 610 and a first mounting hole 620. The fixing pin 610 passes through the first mounting hole 620 to detachably connect with the bracket 200, and the handle 310 is provided with a second mounting hole 311 corresponding to the first mounting hole 620. With this configuration, the bracket 200 is mounted inside the outer casing 600, and the outer casing 600 provides protection, support, and aesthetic enhancement for the internal structure. A scale is provided on the side of the outer casing 600 near the binding mechanism 500, with the scale corresponding to the position of the iron ring to be pressed, allowing the user to visually determine the diameter of the iron ring. This facilitates the adjustment of the adjusting member 540 and the selection of the appropriate distance between the binding plate 520 and the bottom plate 530 according to the size of the iron ring. As shown in FIG. 17, the side of the outer casing 600 near the handle 310 is provided with a fixing pin 610 and a first mounting hole 620, and the handle 310 is provided with a second mounting hole 311 that mates with the fixing pin 610. Preferably, one end of the fixing pin 610 is detachably fixed to the bracket 200 through the first mounting hole 620. When a punching and binding machine is in standby mode, the handle 310 can be rotated downward to the storage position, aligning the first mounting hole 620 with the second mounting hole 311. The fixing pin 610 is then passed through the first mounting hole 620 and the second mounting hole 311 to secure the handle 310 in place, locking it in the stored position.

In this embodiment, one side of the punching mechanism 400 is provided with a positioning block 480, and the base 100 is equipped with a positioning hole 110 corresponding to the positioning block 480. The positioning block 480 is movably inserted into the positioning hole 110. With this configuration, the positioning block 480 is detachably inserted into the positioning hole 110 to achieve precise positioning of the punching mechanism 400 during the punching operation. The positioning block 480 and the positioning hole 110 form a positioning fitting structure used to position the placement of the paper to be punched, ensuring that it maintains an accurate spatial relationship with the punching cutter 420 and the second through hole 441 during the punching process. During use, when the user needs to punch A3-sized paper, after punching one part of the A3 paper, the remaining part needs to be bound. The completed holes are aligned with the positioning hole 110, and the positioning block 480 is sequentially passed through the hole and the positioning hole 110, after which the remaining part is punched. This structure ensures the consistency of the punching positions for large-sized paper.

Figure 14:
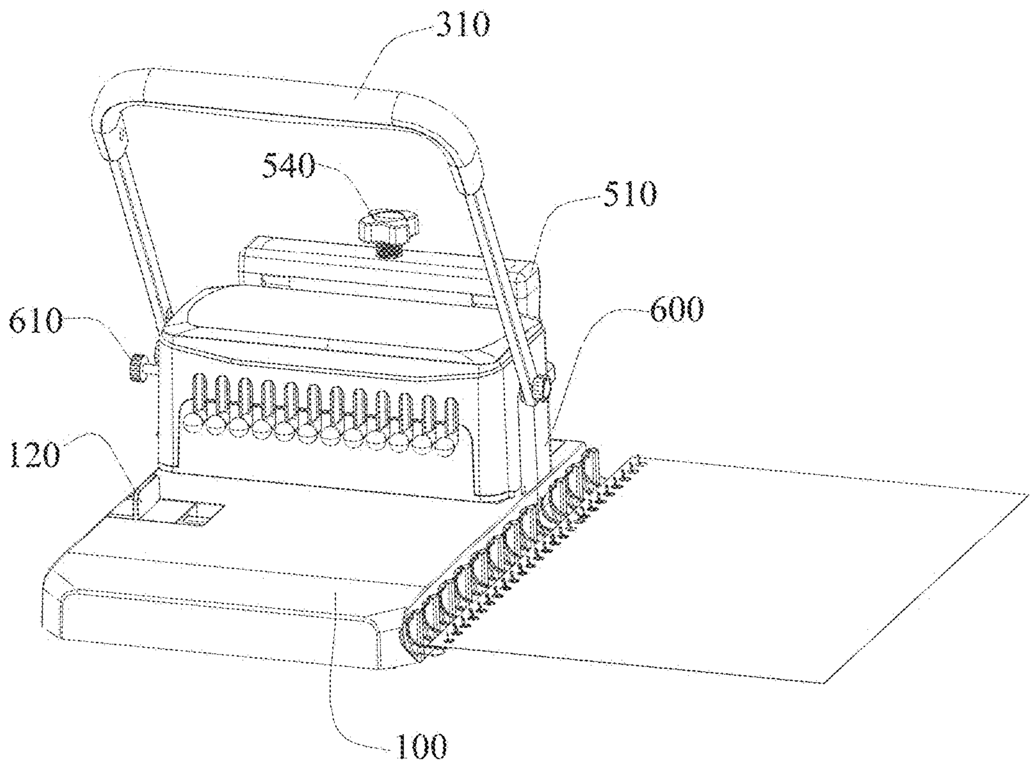
FIG. 14 is a schematic view of the structure in the first operating state of the present invention.

In this embodiment, the surface of the base 100 near the punching mechanism 400 is provided with a positioning plate 120; the bottom of the base 100 is equipped with an anti-slip member 130. With this configuration, the positioning plate 120 is used for laterally or longitudinally limiting the punching paper. In the standby state, the positioning plate 120 can rotate and be stored toward the edge of the base 100. The bottom of the base 100 is equipped with an anti-slip member 130, which is preferably made of a rubber pad or anti-slip foot pad. This increases the friction between the base 100 and the work surface, effectively preventing slipping during the punching or pressure ring operation. The positioning plate 120 works in conjunction with the punching mechanism 400 to ensure consistent paper positioning with each punching operation, improving the relative accuracy between the punching hole and the paper's edge, which is beneficial for the subsequent assembly and matching with the iron ring. Preferably, as shown in FIG. 14, one side of the base 100 is provided with a positioning area or groove structure for an open iron ring (the iron ring to be pressed). During the operation, one end of the open iron ring can be placed in this area, while the other end is used to receive the punched paper. This facilitates the accurate fitting of the punched paper into the iron ring, completing the pre-assembly of the paper ring and iron ring, and providing convenience for the subsequent pressure ring operation.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

The invention claimed is:

1. The punching and binding machine comprises:

a base (100);

a bracket (200), wherein the bracket (200) is fixed to the base (100);

a drive mechanism (300), wherein the drive mechanism (300) is connected to the bracket (200);

a punching mechanism (400), comprising a limit plate (410), a plurality of punching cutters (420), and a plurality of adjustment pins (430), wherein the limit plate (410) is slidably connected to the drive mechanism (300), wherein each adjustment pin (430) is connected to a top of a corresponding punching cutter (420), and the limit plate (410) is provided with a plurality of limit grooves (411) that allows the plurality of adjustment pins (430) to slide and insert, wherein the drive mechanism (300) drives the limit plate (410) to move, and the plurality of adjustment pins (430) move between an abutting state and a sliding state, wherein in the abutting state, the plurality of adjustment pins (430) abut against a corresponding limit point of the corresponding limit grooves (411), and the limit plate (410) drives the corresponding punching cutters (420) to move synchronously, wherein in the sliding state, the limit grooves (411) allows the plurality of adjustment pins (430) to move within them; and a binding mechanism (500), wherein the binding mechanism (500) is slidably connected to the bracket (200), and the drive mechanism (300) drives the binding mechanism (500) to move between a compression ring position and a release position.

2. The punching and binding machine according to claim 1, characterized in that a limiting block (431) protruding from a surface of each of the plurality of adjustment pins (430), wherein in the abutting state, the limiting blocks (431) abut against the limiting points, and the limiting plate (410) drives the plurality of punching cutters (420) to move downward synchronously; in the sliding state, the limiting grooves (411) allow the plurality of adjustment pins (430) to move within the limiting grooves.

3. The punching and binding machine according to claim 1, wherein the limiting groove (411) comprises a first groove (4111) and a second groove (4112) communicating with the first groove (4111), and the limiting point is located at the junction of the first groove (4111) and the second groove (4112).

4. The punching and binding machine according to claim 3, wherein a vertical distance from a bottom of each of the second grooves (4112) to a groove opening of each of the second grooves is not identical.

5. The punching and binding machine according to claim 1, wherein the driving mechanism (300) includes a handle (310), a drive shaft (320), and a drive member (330), with the drive shaft (320) rotatably connected to the bracket (200), the handle (310) rotatably sleeved on both sides of the drive shaft (320), the drive member (330) being disposed adjacent to the handle (310), and the drive member (330) being connected to the limiting plate (410), such that the handle (310) drives the drive shaft (320) and the drive member (330) to rotate synchronously, thereby causing the limiting plate (410) to move vertically.

6. The punching and binding machine according to claim 5, wherein the drive member (330) includes a coupling portion (331) and a meshing portion (332), the limiting plate (410) being provided with a coupling hole (413) that allows the coupling portion (331) to be engaged, and the coupling portion (331) and the meshing portion (332) being located on both sides of the drive shaft (320).

7. The punching and binding machine according to claim 6, wherein the driving mechanism (300) further includes a transmission shaft (340) and a transmission gear (350), the transmission shaft (340) being rotatably connected to the bracket (200), the transmission gear (350) being sleeved on the transmission shaft (340), and the transmission gear (350) being connected to the binding mechanism (500), the transmission gear (350) meshing with the meshing portion (332), and the handle (310) driving the meshing portion (332) to rotate, thereby driving the transmission gear (350) to rotate synchronously, causing the binding mechanism (500) to move vertically.

8. The punching and binding machine according to claim 7, wherein the driving mechanism (300) further includes a transmission plate (360), the transmission plate (360) being provided with a gear groove (361) that meshes with the transmission gear (350), the transmission plate (360) being slidably connected to the bracket (200) and fixedly connected to the binding mechanism (500), and the rotation of the transmission gear (350) simultaneously driving the transmission plate (360) to move vertically, thereby driving the binding mechanism (500) to move vertically.

9. The punching and binding machine according to claim 8, wherein the bracket (200) is provided with a second guide rail (220), and a drive portion (362) protrudes from an end of the transmission plate (360), the drive portion (362) being slidably inserted into the second guide rail (220) and moving vertically along the second guide rail (220).

10. The punching and binding machine according to claim 8, wherein the binding mechanism (500) includes a connecting plate (510) and a binding plate (520) slidably connected to the connecting plate (510), the upper end of the transmission plate (360) being fixedly connected to the connecting plate (510), and the transmission plate (360) driving the connecting plate (510) to move vertically, thereby driving the binding plate (520) to move vertically.

11. The punching and binding machine according to claim 10, wherein the binding mechanism (500) further includes a base plate (530) for placing iron rings, the base plate (530) being connected to the base (100), and when the binding plate (520) moves downward and approaches the base plate (530), the binding plate (520) applies pressure to the iron rings.

12. The punching and binding machine according to claim 10, wherein the binding mechanism (500) further includes an adjusting member (540), the adjusting member (540) being respectively connected to the binding plate (520) and the connecting plate (510), and the adjusting member (540) adjusting the distance between the connecting plate (510) and the binding plate (520).

13. The punching and binding machine according to claim 1, wherein the bracket (200) is provided with a first guide rail (210), and a connecting portion (412) protrudes from an end of the limiting plate (410), the connecting portion (412) being slidably inserted into the first guide rail (210) and moving vertically along the first guide rail (210).

14. The punching and binding machine according to claim 1, wherein the punching mechanism (400) further includes a punching frame (440) connected to the base (100), an upper end of the punching frame (440) being provided with a second through hole (441), and the driving mechanism (300) driving the plurality of punching cutters (420) to move vertically along the second through hole (441).

15. The punching and binding machine according to claim 8, wherein the punching mechanism (400) further includes a guide frame (450), a lower end of the guide frame (450) being provided with a first through hole (451), the punching cutter (420) passing through the first through hole (451) and corresponding one-to-one with the second through hole (441).

16. The punching and binding machine according to claim 9, wherein the punching mechanism (400) further includes a return torsion spring (460), one end of the return torsion spring (460) being connected to the guide frame (450) and the other end being connected to the drive shaft (320).

17. The punching and binding machine according to claim 8, wherein the punching mechanism (400) further includes a scrap box (470), the scrap box (470) being positioned below the punching frame (440), and the receiving space of the scrap box (470) being in communication with the second through hole (441).

18. The punching and binding machine according to claim 1, wherein it further includes a housing (600), the bracket (200) being located inside the housing (600), one side of the housing (600) near the binding mechanism (500) being provided with a scale line to indicate the diameter of an iron ring; one side of the housing (600) near the handle (310) being provided with a fixing pin (610) and a first mounting hole (620), the fixing pin (610) passing through the first mounting hole (620) to detachably connect with the bracket (200), and the handle (310) being provided with a second mounting hole (311) corresponding to the first mounting hole (620).

19. The punching and binding machine according to claim 1, wherein one side of the punching mechanism (400) is provided with a positioning block (480), the base (100) being provided with a positioning hole (110) corresponding to the positioning block (480), and the positioning block (480) being movably inserted into the positioning hole (110).

20. The punching and binding machine according to claim 1, wherein the surface of the base (100) near the punching mechanism (400) is provided with a positioning plate (120); a bottom of the base (100) is provided with an anti-slip member (130).

* * * * *